USO05477237A

United States Patent [19]
Parks

[11] Patent Number: 5,477,237
[45] Date of Patent: Dec. 19, 1995

[54] POSITIONING DEVICE REPORTING X, Y AND YAW MOTION

[75] Inventor: Terry J. Parks, Round Rock, Tex.

[73] Assignee: Dell USA, L.P., Austin, Tex.

[21] Appl. No.: 275,089

[22] Filed: Jul. 14, 1994

Related U.S. Application Data

[63] Continuation of Ser. No. 82,173, Jun. 24, 1993, abandoned.

[51] Int. Cl.$^6$ .................................................. G09G 5/00
[52] U.S. Cl. ........................................ 345/156; 345/163
[58] Field of Search ...................................... 345/157, 156, 345/163, 164; 371/62

[56] References Cited

U.S. PATENT DOCUMENTS

| | | | |
|---|---|---|---|
| 3,320,440 | 5/1967 | Reed | 371/62 |
| 5,162,781 | 11/1992 | Cambridge | 340/706 |

OTHER PUBLICATIONS

IBM Technical Disclosure Bulletin 27(6):3423–3424.

*Primary Examiner*—Richard Hjerpe
*Attorney, Agent, or Firm*—Jeff Hood; James Huffman

[57] ABSTRACT

A pointing device or mouse which monitors motion in both the X and Y directions as well as in the yaw or rotational direction. The pointing device hence monitors three degrees of freedom and thus provides a more accurate indication of the position of the device. One embodiment comprises a pointing device which includes two motion indicators or mouse balls integrated into the bottom of the device which detect change of motion or position in one X and two Y directions. Separate Y measurements are made for each of the respective balls because yaw or rotation of the device causes the line movements for the two balls to differ. The two balls are preferably a distance L apart, and the rotation and translation of the respective balls are measured by the change in position with reference to a center point between the two balls. The two mouse balls generate signals indicating positive or negative motion in the respective directions. A method is included which interprets these signals and generates translation and rotation vectors for use by position and orientation tracking software. This method includes a small filter which groups together pseudo-simultaneous signals in the two Y directions that differ only by a small period of time.

28 Claims, 7 Drawing Sheets

| $Y_1$ | $-Y_1$ | $Y_2$ | $-Y_2$ | $\theta_{pd}$ (ROTATION) | $Y_{pd}$ (TRANSLATION) |
|---|---|---|---|---|---|
| 0 | 0 | 0 | 0 | 0 | 0 |
| 0 | 0 | 0 | 1 | $-\theta$ | $-\Delta/2$ |
| 0 | 0 | 1 | 0 | $\theta$ | $\Delta/2$ |
| 0 | 1 | 0 | 0 | $\theta$ | $-\Delta/2$ |
| 1 | 0 | 0 | 0 | $-\theta$ | $\Delta/2$ |
| 1 | 0 | 1 | 0 | 0 | $\Delta$ |
| 0 | 1 | 0 | 1 | 0 | $-\Delta$ |
| 1 | 0 | 0 | 1 | $-2\theta$ | 0 |
| 0 | 1 | 1 | 0 | $2\theta$ | 0 |

FIGURE 6

POSITION AND ORIENTATION TRACKING

POSITIONING DEVICE REPORTING X, Y AND YAW MOTION

This is a continuation of application Ser. No. 08/082,173 filed on Jun. 24, 1993, now abandoned.

SPECIFICATION

1. Field of the Invention

The present invention relates to pointing devices which provide indications of motion, and more particularly to a pointing device which provides information on changes in the X and Y directions as well as changes in the yaw or rotation of the device.

2. Description of the Related Art

Computer systems typically include a number of different mechanisms for receiving input or allowing a user to make a selection. For example, one commonly used input mechanism is a keyboard, which is used to type commands or information into the computer system. Another common input device is referred to as a pointing device or mouse, which is typically used in conjunction with computer systems having a graphical user interface (GUI). In computer systems having a GUI, physical movement of the pointing device on a surface causes a corresponding on-screen movement of the cursor to a desired position. This enables the user to manipulate windows, indicate a desired menu selection, and perform various other functions. One or more buttons atop the device are generally included to allow the user to indicate various types of desired input, such as selection of a menu item.

Many pointing devices or mice are based on a mechanical design whereby a small ball protrudes through the mouse's bottom and rotates as the mouse is moved along a surface. Switches, rollers, or odometer wheels inside the mouse detect the ball's movement and relay the direction of the ball's rotation to the host computer. The two rollers or odometer wheels inside the mouse ball cavity are opposed at 90 degrees to each other to measure horizontal and vertical movement. When both rollers are turning, the movement is oblique, and electronics associated with the pointing device interpret the relative speed and direction of the rollers' movement to compute the approximate direction of the device's movement.

In one type of mechanical design, as the mouse is moved along the desktop, the ball touches rollers, also referred to as "shafts", which cause copper contacts, or brushes, to sweep across a segmented conductor. The conducting strips in the segmented conductor are attached to a circular board in a spoke-like arrangement, essentially forming a conducting wheel. As the moving conductor steps across the segmented contacts, electrical pulses are generated and counted in attached electronic circuitry. The pulses can be either negative or positive, depending on the direction of the ball's rotation. Thus, the polarity of the pulses provides information on the direction the mouse is moving, and the number of pulses per unit time indicates how fast the mouse is moving.

One alternative design to the mechanical mouse is referred to as the optical mouse. Instead of a rotating ball, the optical mouse uses a light beam to detect movement across a specially patterned mouse pad. The design of an optical mouse uses two pair of LEDs and photodetectors on its bottom, one pair oriented at right angles relative to the other. Thus each pair of LEDs and photodetectors detects motion along one axis of a two-dimensional grid. The light reflected from the pad is received by a small receptor inside the mouse, in some designs moving through a prism or lens onto a mirror which in turn reflects the light into a sensor. The matching mouse pad is segmented into a very fine grid of lines, and as the mouse moves across the lines in the grid, the internal electronics reads the changes in the reflected light, counting the pulses. These pulses are received and counted as in the mechanical design discussed above.

Another type of mouse design is referred to as an opto-mechanical mouse, which is a hybrid design between purely mechanical and purely optical mice. In this design the mechanical ball turns rollers as with the purely mechanical mouse. However, instead of using mechanical electrical contacts, each roller or wheel in the opto-mechanical design rotates a slotted or perforated wheel. An LED (light emitting diode) shines light through the wheel, and an optical sensor on the other side of the wheel counts the resulting pulses. These pulses are provided to electronic circuitry which computes the direction and speed with which the mouse is moving. Thus, the only real difference between the opto-mechanical mouse and the purely mechanical design is the manner in which the electronic pulses are generated.

In each of the above designs, although the pointing device is free to move in any direction, only four directions are actually detected, corresponding to positive and negative movement along X and Y axes of a two-dimensional coordinate system. The movement in each of these four directions is typically quantified (in 100ths of an inch) and sent to the host computer or device as a discrete signal for each discrete increment of movement. One problem with current mice technology is that, with respect to mechanical and opto-mechanical mice, the motion reported is actually the motion of the rollers or wheels contacting the ball within the mouse, which can only detect movement in the X and Y directions. With respect to optical mice, the motion reported is limited by the two-dimensional grid comprised in the mouse pad. Since rotation of the mouse cannot be detected, the motion reported by the mouse is often inaccurate.

A related problem with current mouse technology is that the motion reported is actually the motion of the object moving the mouse, i.e., the human user or machine in which the mouse is embedded, and this motion is reported with respect to the mouse's frame of reference. This many times results in an inaccurate indication of motion because, when the mouse is rotated or turned without corresponding movement in the X or Y directions, the relationship between the mouse's frame of reference and the frame of reference of the user or machine varies with time. This changing frame of reference cannot be recorded by current mouse technology.

The above inaccuracies in current mouse technology do not result in serious problems in applications where the mouse is used in conjunction with a graphical user interface. Most GUI software provides immediate visual feedback to the user of the pointing device, and thus the user can simply modify the motion of the mouse to move the cursor to the desired position. Although the user can generally modify the position of the mouse in this manner, an improved mouse design is desired which more closely corresponds to a user's movement of the respective pointing device and thus does not require continual user modification of the mouse's motion to compensate for the mouse's inaccuracy.

In addition, the intelligent feedback path provided by a GUI is not available if the respective pointing device is being used for something other than simply moving a cursor on a display screen. For example, new applications are currently being developed for pointing devices wherein the system may be unable to provide immediate visual feedback to a user of the reported motion of the pointing device. These applications thus require much greater resolution and accuracy than current mouse technology can provide. For example, U.S. patent application Ser. No. 08/085,219 (DC-00417), entitled "Personal Digital Assistance Device With Combined Scanner and Fax Modem Capabilities," filed on Jun. 29, 1993, and assigned to the same assignee as the present invention, discloses a personal digital assistance (PDA) device which includes a one-dimensional scanner and a positioning device which enables this one-dimensional scanner to coherently scan a two-dimensional image. The scanner scans single or multiple lines of the image, and one requirement of the pointing device is that it provide accurate information on the location and orientation of the respective line or lines being scanned with respect to prior scanned lines. This allows the PDA to correctly position multiple strips of the image or document scanned and concatenate these strips into an exact reproduction of the final image. For the pointing device to operate properly in this application, the pointing device must be able to keep track of turns and rotations, i.e., must be able to report motion with regard to the user's or document's frame of reference, not merely the pointing device's frame of reference.

Therefore, a pointing device having greater accuracy than currently available mouse technology is desired. The pointing device should be able to provide information on motion with respect to the user's frame of reference, not merely the mouse's frame of reference. In addition, a pointing device is desired which can provide information on the location and orientation of a scanning device on a document with respect to prior scanned lines of the document to allow intelligent scanning and recording of a 2-dimensional document by a one-dimensional scanner.

SUMMARY OF THE INVENTION

The present invention comprises a positioning device which is capable of monitoring motion in both the X and Y directions as well as in the yaw or rotational direction. The pointing device of the present invention hence monitors three degrees of freedom and thus provides a more accurate indication of the position of the device. In addition, monitoring of the yaw direction in addition to the X and Y directions allows the pointing device to provide information on the location and orientation of a line being scanned with respect to prior scanned lines. This allows a one-dimensional scanner to intelligently scan a 2-dimensional document.

One embodiment of the present invention comprises a pointing device which includes two mechanical mouse balls integrated into the bottom of the device. The balls roll on the respective work surface when the pointing device is moved. Odometer wheels adjut each of the respective balls and measure the distance the balls move. The odometer wheels for one ball measure the distance the ball moves in the Y direction, referred to as $Y_1$. The odometer wheels for the second ball measure the distance travelled in both the X and Y directions, referred to as X and $Y_2$, respectively. Separate Y measurements are made for each of the respective balls because yaw or rotation of the device causes the Y movements for the two balls to differ. Retaining balls are used for each of the balls to hold the balls against the odometer wheels to ensure that they measure distance accurately.

The two balls are preferably a distance L apart, and the rotation and translation of the respective balls are measured by the change in position with reference to a center point between the two balls. The odometer wheels for the respective balls include hardware which generates six signals referred as X, $^-$X, $Y_1$, $^-Y_1$, $Y_2$, and $^-Y_2$, indicating positive or negative motion in the respective directions. A method is included which interprets these six signals and generates translation and rotation vectors for use by position and orientation tracking software. This method includes a small filter which groups together pseudo-simultaneous signals in the $Y_1$ and $Y_2$ directions that differ only by slight phase displacements between the two odometer wheels for the respective balls. $Y_1$ and $Y_2$ measurements that are deemed pseudo-simultaneous, as well as measurements in the X direction, are used to generate rotation and translation information which indicates the actual movement of the pointing device with respect to the pointing device's previous position. Position and orientation tracking software uses this translation and rotation information to generate X and Y coordinates representing the actual location of the device relative to the surface on which the device is being moved.

Therefore, an improved pointing device is disclosed which provides information on movement in both the X, Y and yaw directions. This provides a more accurate indication of movement than current mouse technology. In addition, monitoring of three degrees of freedom enables the pointing device to be incorporated into other equipment or machinery, such as a hand-held scanner or PDA, where immediate feedback to a user may not be provided to allow compensation for inaccuracies.

BRIEF DESCRIPTION OF THE DRAWINGS

A better understanding of the present invention can be obtained when the following the detailed description of the preferred embodiment is considered in conjunction with the following drawings, in which.

DETAILED DESCRIPTION OF THE PREFERRED EMBODIMENT

Figure 1:
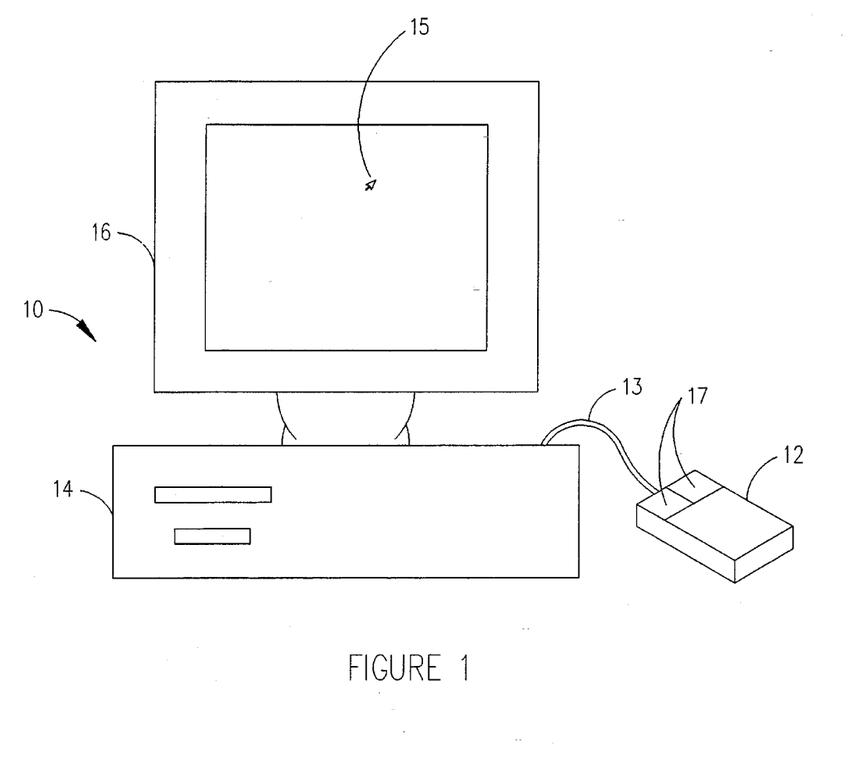
FIG. 1 illustrates a computer system having a pointing device according to one embodiment of the present invention.

Referring now to FIG. 1, a computer system 10 utilizing a pointing device or mouse 12 according to one embodiment of the invention is shown. In the following description, the terms pointing device and mouse are used interchangeably. The computer system 10 includes a system unit 14 and monitor 16. The pointing device or mouse 12 is connected to the system unit 14 through a cable 13 as shown. A keyboard (not shown) may be connected to the system unit 14. In the embodiment of FIG. 1, the pointing device 12 is intended to be used by a human user in conjunction with a graphical user interface (GUI) to move a cursor 15 on the monitor screen 16. In this embodiment, the device 12 may include one or more push buttons 17 for selection of menu items or for other functions as desired.

In an alternate embodiment of the invention, the pointing device 12 is used in conjunction with a machine or other device to provide an indication of motion to the machine. For example, in one embodiment of the invention, the pointing device 12 of the present invention is incorporated into a personal digital assistance (PDA) device which includes combined scanner and fax modem capabilities that enable the PDA device to optically scan documents for subsequent storage or transmission as a facsimile. The PDA device in this embodiment uses a one-dimensional CCD scanner along with the positioning device of the present invention to scan a two-dimensional image. The CCD scanner scans the respective lines of the image, and the pointing device 12 of the present invention provides information regarding the location and orientation of the respective lines being scanned with respect to prior scanned lines. This information allows logic in the scanner to correctly position and concatenate multiple scanned strips of a document or image into an exact reproduction of the document or image. For more information on the operation of the PDA device of this embodiment including the pointing device technology of the present invention, please see related co-pending application Ser. No. 08/085,219 (DC-00417), entitled "Personal Digital Assistance Device With Combined Scanner and Fax/Modem Capabilities," filed Jun. 29, 1993 and assigned to the same assignee as the present invention, which is hereby incorporated by reference.

Figure 2:
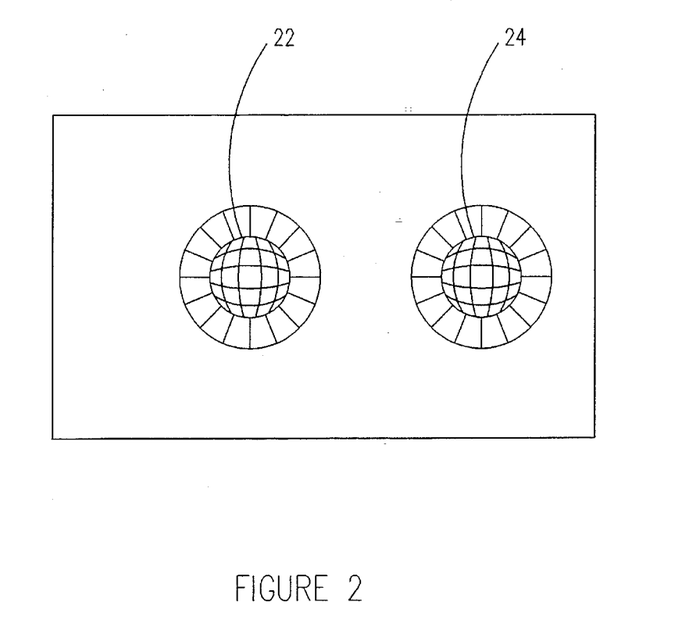
FIG. 2 is a bottom view of the pointing device of FIG. 1.

Referring now to FIG. 2, a bottom view of the pointing device 12 is shown. In the preferred embodiment, the pointing device 12 in FIG. 1 comprises an opto-mechanical design using two mechanical mouse balls 22 and 24 as indicators of motion. The mouse balls 22 and 24 are integrated into the bottom of the pointing device 12 and roll on the respective work surface when the pointing device 12 is moved. In an alternate embodiment of the invention, the pointing device 12 utilizes an optical mouse technology wherein, instead of rotating balls, light beams are used to detect movement across a specially patterned mouse pad. It is noted that virtually any type of mouse technology, and thus any type of motion indicator, including mechanical, optical, and opto-mechanical, may be used to implement the present invention. In the embodiment shown in FIG. 2, the two balls 22 and 24 are situated such that the center point C (FIG. 3) between the balls 22 and 24 is not in the exact center of the pointing device 12. However, in the preferred embodiment, the balls 22 and 24 are positioned such that the center point C is positioned in the exact center of the pointing device 12 for increased accuracy.

Figure 3:
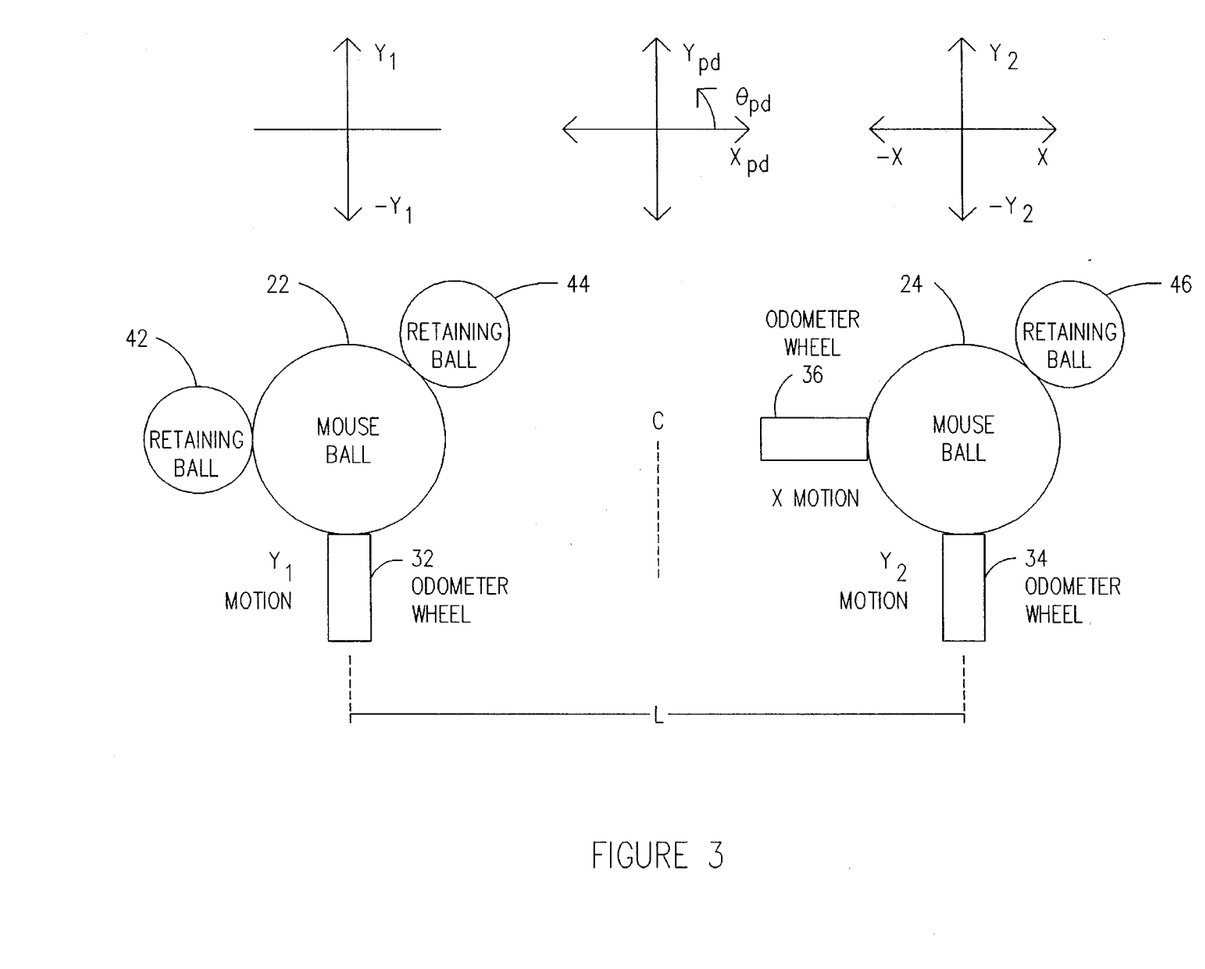
FIG. 3 illustrates the organization of the mechanical mouse balls in the pointing device of FIG. 1.

Referring now to FIG. 3, the internal arrangement of the mouse 12 according to one embodiment of the invention is shown. An odometer wheel or roller 32 adjuts the ball 22, and odometer wheels 34 and 36 adjut the ball 24. The odometer wheels 32–36 measure the distance the balls 22 and 24 move in respective directions. The odometer wheel 32 for ball 22 measures the distance travelled in the Y direction, referred to as $Y_1$. The odometer wheels 36 and 34 measure the distance the ball 24 moves in both the X and Y directions referred to as X and $Y_2$, respectively. Separate Y measurements are made for each of the respective balls 22 and 24 because yaw or rotation of the pointing device 12 causes the Y movements for the two balls to differ. Retaining balls 42, 44, and 46 are used for the balls 22 and 24 to hold the balls 22 and 24 against the odometer wheels 32–36 to ensure that they measure distance accurately. Retaining balls 42 and 44 are used to hold mouse ball 22, and retaining ball 46 is used to hold mouse ball 24, as shown. The two mouse balls 22 and 24 are preferably a distance L apart, and the actual rotation and translation of the mouse 12 are measured by the change in position with reference to a center point C between the two balls 22 and 24, as shown.

Figure 4:
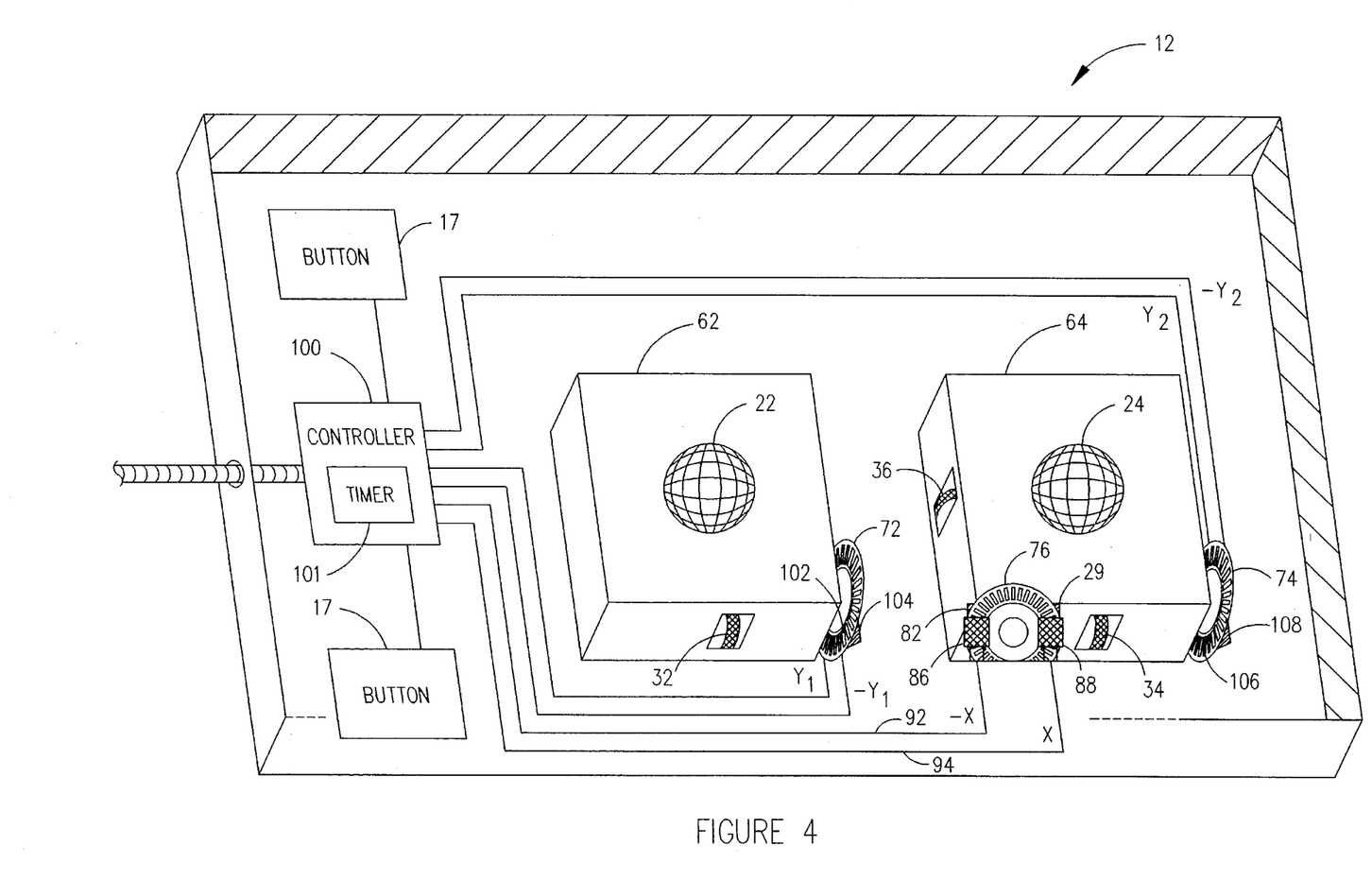
FIG. 4 is a top view illustrating operation of the pointing device according to one embodiment of the invention.

Referring now to FIG. 4, a top view of the pointing device 12 illustrating its internal operation is shown. The pointing device 12 in the embodiment shown in FIG. 4 utilizes an opto-mechanical design as described below. However, as previously noted, other types of mouse designs using various types of motion indicators may be used including a purely mechanical design as well as a purely optical design, among others. Because the manner of operation of mechanical and optical mice are well known to those skilled in the art, details of their operation are omitted for simplicity, and only the opto-mechanical design is discussed below.

The pointing device 12 includes housings 62 and 64 for holding mechanical mouse balls 22 and 24, respectively. When the pointing device 12 is moved along a surface, the balls 22 and 24 rotate which in turn causes the odometer wheels 32, 34, and 36 to turn. The rotation or turning of the odometer wheel 36 turns the slotted or perforated wheel 76 as shown. Light emitting diodes or LEDs 82 and 84 are positioned behind the slotted wheel 76 and are barely visible in FIG. 4. The LEDs 82 and 84 shine light through the slotted wheel 76 which is received by photodetectors 86 and 88. An additional mask (not shown) is preferably placed between the respective LEDs 82 and 84 and the slotted wheel 76 to prevent light from passing to the photodetectors 86 and 88 unless one of the perforations is exactly in front of the respective LED 82 and 84. The photodetectors 86 and 88 receive pulses of light as the slotted wheel 76 is turned and light is allowed to pass through the slots in the wheel 76. These pulses are generated on wires 92 and 94 which are connected to a controller chip 100. The wires 92 and 94 carry information regarding translation of the pointing device 12 in the –X and X directions, respectively. Translation of the pointing device 12 in the X and –X directions corresponds to movement of the pointing device 12 in the X and –X directions as illustrated by the coordinate system in FIG. 3.

In a similar manner, the odometer wheels 32 and 34 are each rotated by the respective mouse balls 22 and 24 and in turn rotate slotted wheels 72 and 74, respectively. Two pair of LEDs and photodetectors are included with each slotted wheel 72 and 74. In FIG. 4, only one LED/photodetector pair 102 and 104 is shown with respect to the slotted wheel 72 and only one LED/photodetector pair 106 and 108 is shown with respect to the slotted wheel 74. The other LED/photodetector pairs for the slotted wheels 72 and 74 cannot be seen due to the perspective shown in FIG. 4. The LED/photodetector pairs for the slotted wheels 72 and 74 operate as described with the slotted wheel 76. The photodetectors for the slotted wheel 72 generate signals referred to as $Y_1$ and $-Y_1$ which are connected to the controller 100. The photodetectors for the slotted wheel 74 generate signals referred to as $Y_2$ and $-Y_2$ which are also connected to the controller 100. Translation of the pointing device 12 in the $Y_1$, $-Y_1$, $Y_2$, and $-Y_2$ directions corresponds to movement of the respective mouse balls 22 and 24 in the directions illustrated by the coordinate systems in FIG. 3. The two buttons 17 are also connected to the controller 100, as shown.

The controller 100 implements a translation and rotation interpretation method which receives the six signals X, −X, $Y_1$, −$Y_1$, $Y_2$, and −$Y_2$ and generates X, Y, and yaw values regarding the movement of the pointing device 12 relative to its center point C. The X, Y and yaw values generated are referred to as $X_{pd}$, $Y_{pd}$, and $\theta_{pd}$, respectively. In the preferred embodiment, the translation and rotation interpretation method includes a filter which groups together pseudo-simultaneous signals on the $Y_1$, −$Y_1$, $Y_2$, and −$Y_2$ wires and generates the translation and rotation values $Y_{pd}$ and $\theta_{pd}$ in the Y and yaw directions, respectively. The filter considers signals on the $Y_1$, −$Y_1$, $Y_2$, and −$Y_2$ wires to be simultaneous when they differ by slight phase misadjustments between the two odometer wheels 32 and 34, as described below. The value $X_{pd}$ is set equal to the X translation reported by the mouse ball 24.

Figure 5:
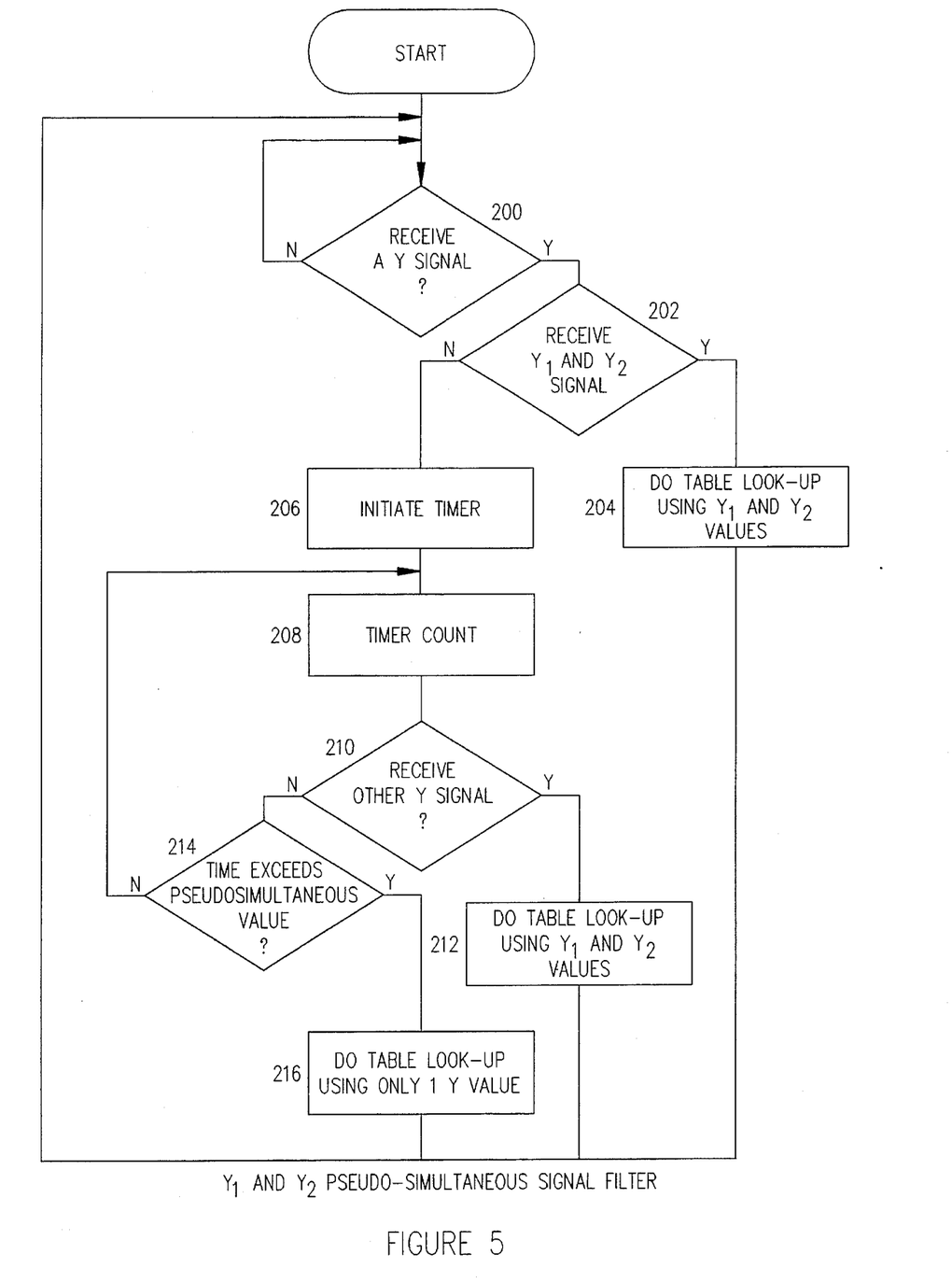
FIG. 5 is a flowchart diagram illustrating operation of the translation and rotation interpretation method of the present invention.

Referring now to FIG. 5, a flowchart diagram illustrating operation of the translation and rotation interpretation method implemented in the controller 100 is shown. It is noted that certain of the steps described below will occur asynchronously, and these steps are represented in flowchart form for ease of explanation. In step 200 the controller 100 determines whether it has received a signal from one of the $Y_1$, −$Y_1$, $Y_2$, or −$Y_2$ signals. If the controller 100 has not received a signal on one of these wires, then it returns to step 200 and continues to monitor these lines. If the controller 100 has received one of these Y signals in step 200, then in step 202 the controller 100 determines if it has received both $Y_1$ and $Y_2$ signals, i.e. if it has received a signal from either of the $Y_1$ and −$Y_1$ signal lines as well as a signal from either of the $Y_2$ and −$Y_2$ signal lines. If so, then the signals were actually generated simultaneously, and the controller 100 performs a table look-up using the $Y_1$ and $Y_2$ values and the look-up table illustrated in FIG. 6, which is described below.

If the controller 100 has not received both $Y_1$ and $Y_2$ signals in step 202, then in step 206 the controller 100 initiates a timer 101 inside the controller 100. In step 208 the timer 101 is counting. In step 210 the controller 100 determines if it has received the other Y signal. For example, if a signal was received on either of the $Y_1$ or −$Y_1$ signal lines in step 200, the controller 100 determines if a signal on either of the $Y_2$ or −$Y_2$ signal lines has been received. If the other Y signal is determined to have been received in step 210, then the controller 100 performs a table look-up using the $Y_1$ and $Y_2$ values in step 212 using the look-up table in FIG. 6. If the other Y signal is not received in step 210, then in step 214 the controller 100 determines if the timer 101 has exceeded a value referred to as the pseudo-simultaneous value. In other words, the receipt of a second Y signal will not be deemed pseudo-simultaneous if a certain period has already elapsed after the receipt of a first Y signal in step 200. This period is preferably 25 milliseconds in the preferred embodiment.

If this period has not elapsed in step 214, then the controller 100 returns to step 208 and the timer 101 resumes counting. If the time has been exceeded in step 214, then in step 216 the controller 100 performs a table look-up using only the one Y value initially received in step 200. Upon completion of either of steps 204, 212, or 216, the controller 100 returns to step 200 and again determines if a new Y signal has been received.

The receipt of the $Y_1$ and $Y_2$ signals actually occur as interrupts to the controller 100 in the preferred embodiment. However, as noted above, these steps are represented in flowchart form for ease of explanation, and the operation of these steps may not be exactly as shown due to the asynchronous nature of interrupts.

Thus, the controller 100 monitors the $Y_1$, −$Y_1$, $Y_2$, and −$Y_2$ signal lines and groups together pseudo-simultaneous signals on these wires. The signals are considered to be simultaneous when they differ by a pseudo-simultaneous value which represents a slight phase misadjustment between the two odometer wheels 32 and 34. The controller 100 then performs a table look-up using these received Y signals to generate Y translation and rotation values $Y_{pd}$ and $\theta_{pd}$.

Figure 6:
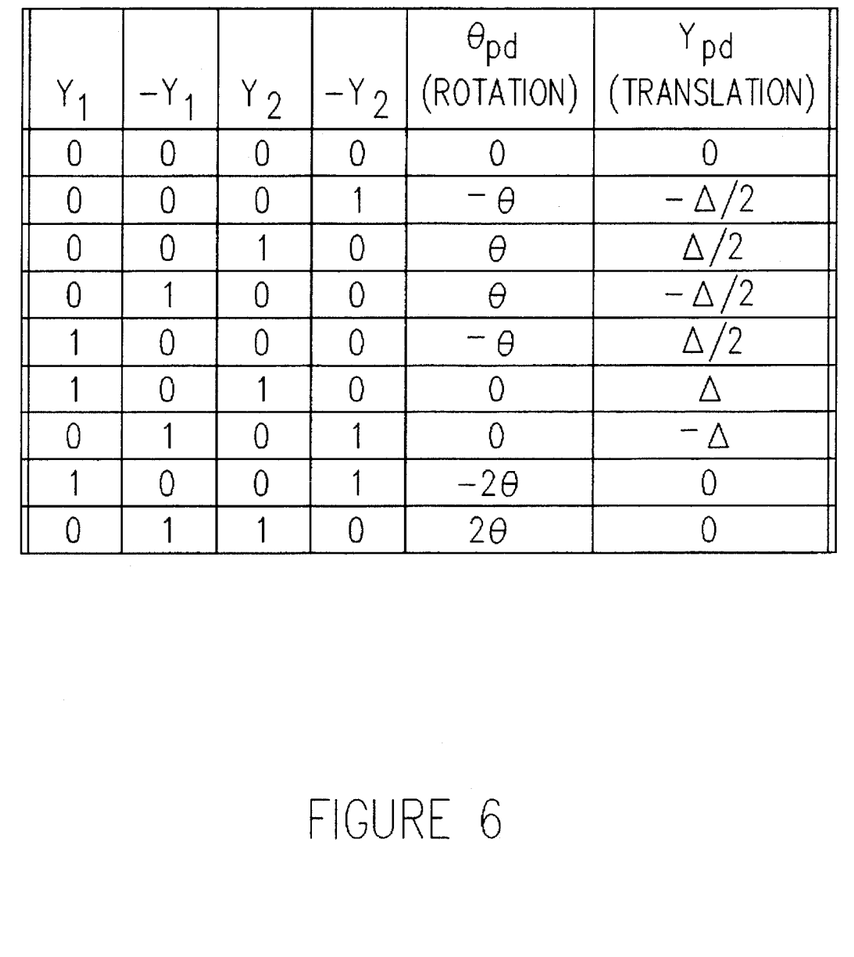
FIG. 6 is a table illustrating data provided by the $Y_1$, $-Y_1$, $Y_2$, $-Y_2$ signal wires and the corresponding translation and rotation information reported by the pointing device according to the present invention.

Referring now to FIG. 6, the look-up table used in steps 204, 212, and 216 to determine the proper Y translation and rotation values from the $Y_1$, −$Y_1$, $Y_2$, and −$Y_2$ signal lines is shown. The values for rotation and Y translation are measured with reference to the center point C between the balls 22 and 24 and, as previously noted, are referred to as $\theta_{pd}$ and $Y_{pd}$, respectively. This is in contrast to the $Y_1$, −$Y_1$, $Y_2$, and −$Y_2$ signal lines, which measure Y translation with respect to the balls 22 and 24, respectively. In the table in FIG. 6, the positive $Y_1$ and $Y_2$ directions are upward for each of the balls 22 and 24, respectively, as shown in FIG. 3, and the negative $Y_1$ and $Y_2$ directions are considered to be movement of the respective balls 22 and 24 downward. Positive and negative X directions are also shown in FIG. 3. The rotation value $\theta_{pd}$ is preferably calculated counterclockwise from the positive X axis as shown in FIG. 3. However, it is noted that any type of convention may be used.

The odometer wheels 32, 34 and 36 generate signals with a resolution Δ of approximately 1/300 inches in the preferred embodiment. Therefore, the resolution in the X and Y dimensions is Δ. The resolution with regard to $\theta_{pd}$ or yaw is Δ/L or θ radians, which corresponds to 0.0033333 radians or approximately 0.19 degrees in the preferred embodiment.

As shown in FIG. 6, if all four of the $Y_1$, −$Y_1$, $Y_2$, and −$Y_2$ signal lines are zero, then no rotation and no translation occurs. If the −$Y_2$ signal line is 1 with the remaining signal lines zero, then there is a Y translation of −Δ/2 and there is a rotation of −θ. If the $Y_2$ signal line is 1 with the remaining signal lines 0, then the pointing device 12 has rotated θ degrees with a translation in the Y direction of Δ/2. If the −$Y_1$ signal line is 1 with the remaining lines 0, then there is a rotation of θ degrees and a Y translation of −Δ/2. If the $Y_1$ signal line is 1 with the remaining lines 0, then there is a rotation of −θ degrees and a Y translation of Δ/2. If the signal lines $Y_1$ and $Y_2$ are both 1, then there is no rotation and there is a Y translation of Δ. In this instance, the pointing device 12 has merely been moved upward in the Y direction without any rotation. If the −$Y_1$ and −$Y_2$ signal lines are both 1 with the $Y_1$ and $Y_2$ signal lines 0, then again there is no rotation and there is translation in the Y direction of −Δ. If the $Y_1$ and −$Y_2$ signal lines are 1 with the remaining signal lines 0, then there is a rotation of −2θ and there is no translation. If the −$Y_1$ and $Y_2$ signal lines are both 1 with the $Y_1$ and −$Y_2$ lines 0, there is rotation of 2θ without any Y translation. In either of the above two instances, one mouse ball has moved upward while the other mouse ball has moved downward, and thus there is a pure rotation of the pointing device 12 without any $Y_{pd}$ translation.

Figure 7A:
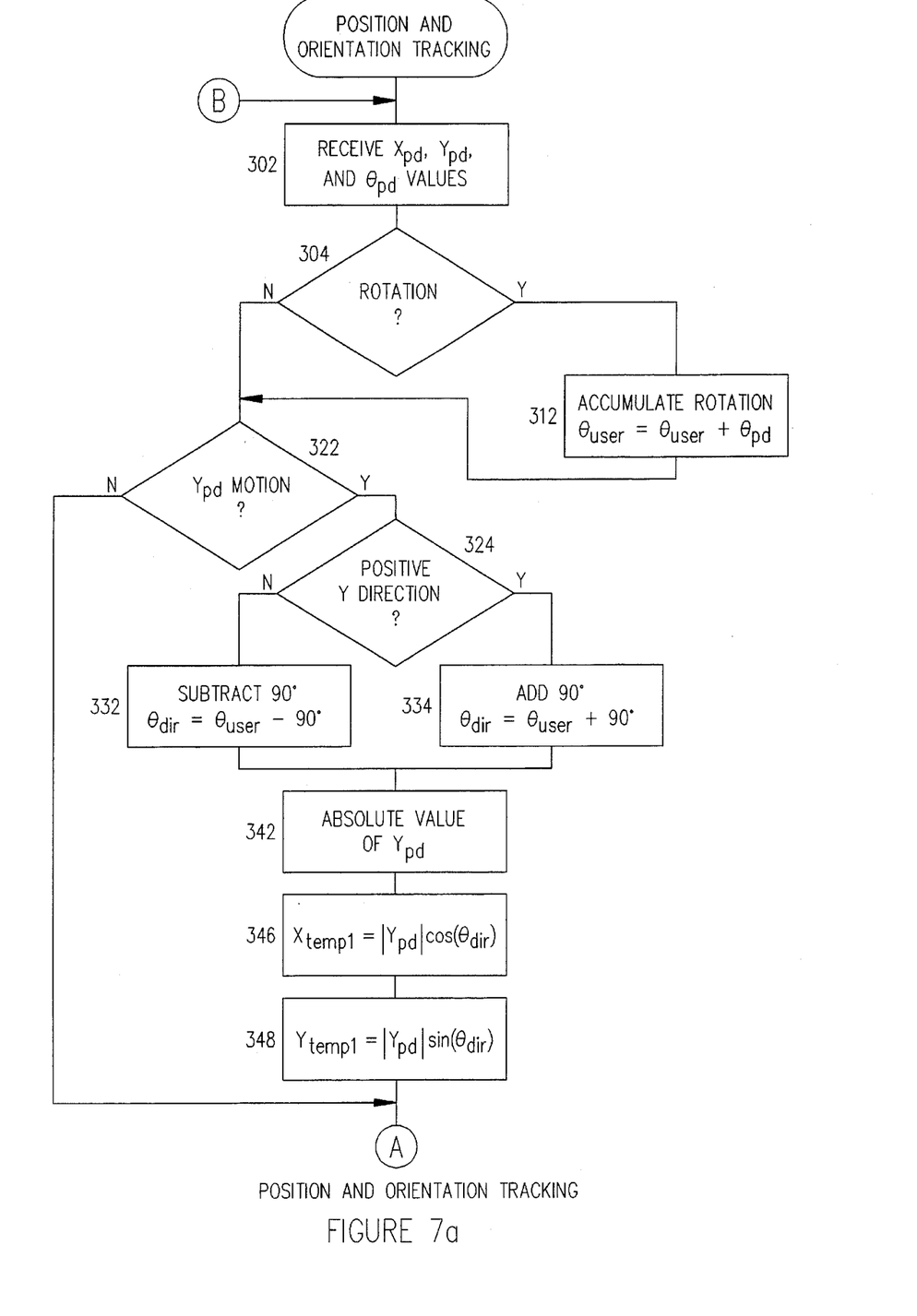
FIGS. 7a and 7b illustrate operation of a position and orientation tracking software according to one embodiment of the invention.
Figure 7B:
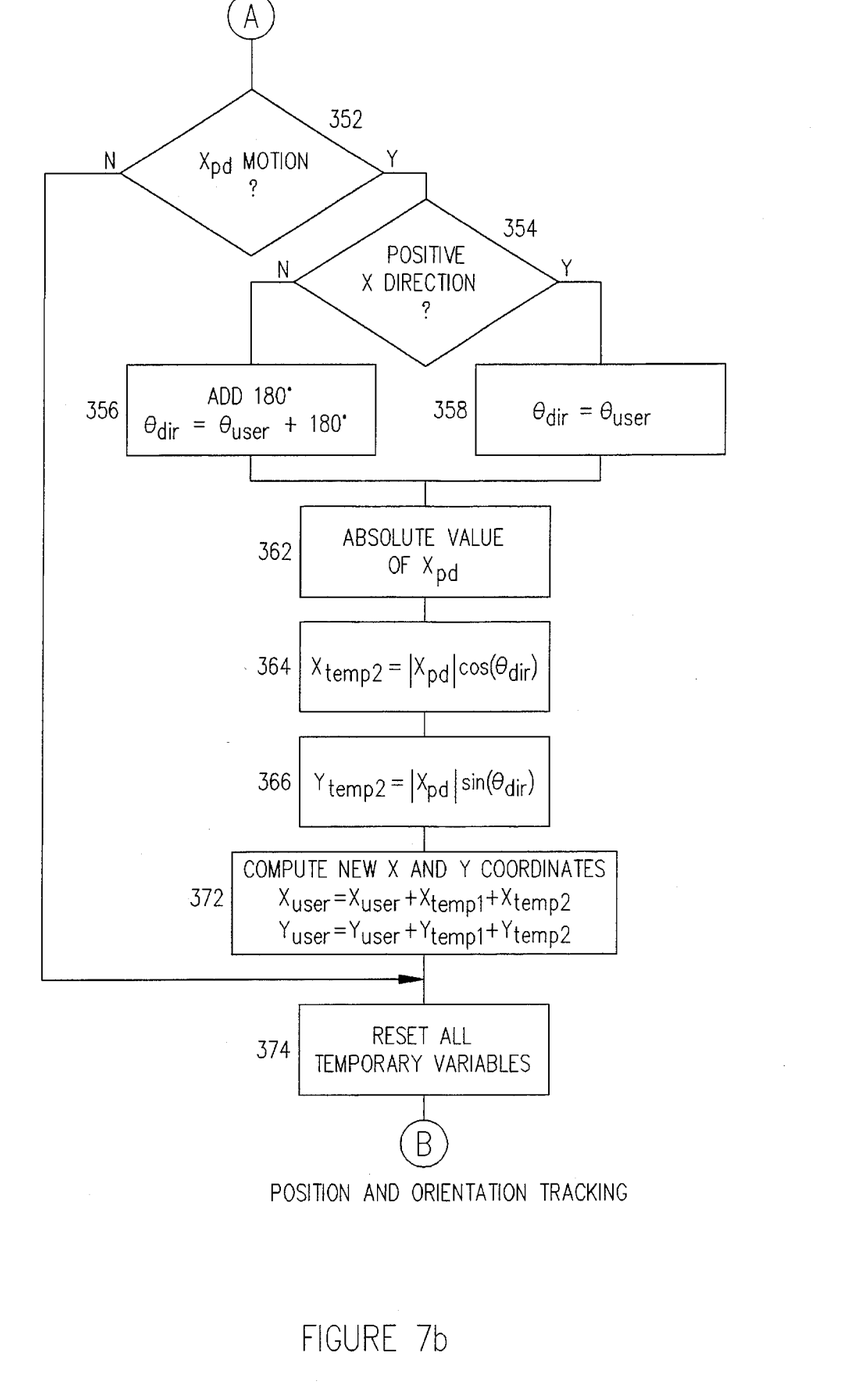

Referring now to FIGS. 7a and 7b, a flowchart diagram illustrating operation of position and orientation tracking software in the computer system of FIG. 1 is shown. In the embodiment shown in FIG. 1, the translation and rotation values generated by the filter, $Y_{pd}$ and $\theta_{pd}$, as well as the value regarding movement in the X direction, $X_{pd}$, is passed through the cable 13 to the computer system 10. In an embodiment where the pointing device 12 is included in a machine, such as a PDA as described in U.S. patent application Ser. No. 08/085,219 referenced previously, the $X_{pd}$, $Y_{pd}$, and $\theta_{pd}$ values are provided to additional logic circuitry in the machine or PDA. In either instance, the $X_{pd}$, $Y_{pd}$, and $\theta_{pd}$ motion information values are provided to position and orientation tracking software which monitors the location and orientation of the device 12 with regard to the prior position and orientation of the device 12.

The position and orientation tracking software monitors the exact position of the device 12 relative to the surface on which the device is being moved. This is in contrast to prior art mice, which can only report changes in position relative to the mouse's frame of reference. In the embodiment shown in FIG. 1, this software is used, for example, to move the cursor 15 on the computer screen 16. In an embodiment where the device 12 is included in a PDA having a scanning capability, this software is used to place scanned data in memory so as to exactly recreate the image of a document being scanned. It is noted that the position and orientation tracking software may also be incorporated into the mouse 12, as desired.

As previously noted, the controller 100 in the mouse 12 generates X, Y and yaw information values referred to as $X_{pd}$, $Y_{pd}$ and $\theta_{pd}$. The value $X_{pd}$ represents the translational motion in the positive or negative X direction since the last reported motion, the value $Y_{pd}$ represents the translational motion in the positive or negative Y direction since the last reported motion, and the value $\theta_{pd}$ represents the rotation of the mouse relative to the last reported orientation of the device 12. The values $Y_{pd}$ and $\theta_{pd}$ are generated by the translation and rotation orientation method illustrated in FIG. 5 using the look-up table in FIG. 6, as previously discussed. The value $X_{pd}$ is passed through the controller 100 from the mouse ball 24 to the system unit 14 comprising the computer system 10.

The position and orientation tracking software implemented by the computer system 10 receives the $X_{pd}$, $Y_{pd}$, and $\theta_{pd}$ values from the mouse 12 and generates X and Y coordinates that are relative to the surface on which the mouse 122 is being moved, i.e., relative to the user. These coordinates are referred to as $X_{user}$ and $Y_{user}$. The software also maintains a running accumulation of the orientation of the mouse 12 relative to its initial placement, referred to as $\theta_{user}$. To summarize, the values $X_{pd}$, $Y_{pd}$, and $\theta_{pd}$ report motion or change of position relative to the pointing device 12, and the values $X_{user}$, $Y_{user}$, and $\theta_{user}$ report motion or change of position relative to the user or surface on which the device 12 is being moved.

In step 302, the computer system 10 receives the $X_{pd}$, $Y_{pd}$ and $\theta_{pd}$ values. In step 304, the computer system 10 determines if there is any rotation element in the reported values, i.e. whether $\theta_{pd}$ is zero or non-zero. If $\theta_{pd}$ is zero and there was no motion of the pointing device 12, then the computer system 10 accumulates the rotation value in step 312. The computer system 10 maintains a running value of the rotation of the mouse 12 relative to its original orientation when placed on a surface. The rotation value is accumulated according to the equation:

$$\theta_{user}=\theta_{user}+\theta_{pd}.$$

Upon completion of step 312, the computer system 10 advances to step 322. If it was determined in step 304 that there was no rotation of the mouse 12 and that $\theta_{pd}$ equals 0, then the computer system 10 advances directly to step 322.

In step 322, the computer system 10 determines if there was any Y translational motion, i.e. if $Y_{pd}$ is non-zero. If there was Y motion, then in step 324, the computer system 10 determines whether the Y motion was in the positive or negative Y direction. If the motion was in the positive Y direction, then in step 334 the computer system 10 creates a new variable $\theta_{dir}$ equal to the previous orientation of the mouse 12 ($\theta_{user}$) plus 90°. If the motion is in the negative Y direction, the computer system 10 sets the variable $\theta_{dir}$ to the previous orientation ($\theta_{user}$) minus 90°. As previously mentioned, the value $\theta_{user}$ is the orientation of the center point C of the mouse 12 along the positive X axis. Therefore, if there is motion in the positive Y direction, the direction of motion actually traveled by the mouse 12 is $\theta_{user}$ plus 90°. Likewise, if the mouse 12 is moving in the minus Y direction, the direction of motion is actually $\theta_{user}$ minus 90°. The variable $\theta_{dir}$ is created in these instances to keep track of the direction of motion of the mouse 12 for the sine and cosine transformations which occur later in the flowchart, as discussed below.

Upon completion of either steps 332 or 334, the computer system 10 calculates the absolute value of the $Y_{pd}$ value. This is done because the variable created in either steps 332 or 334, $\theta_{dir}$, keeps track of the direction of motion. In step 346, the computer system 10 computes a temporary value for movement in the X direction along the $X_{user}$ axis. The computer system 10 computes the value:

$$X_{temp1}=|Y_{pd}| \cos (\theta_{dir}).$$

In step 348, the computer system 10 computes the distance traveled in the Y direction along the $Y_{user}$ axis. This value is:

$$Y_{temp1}=|Y_{pd}| \sin (\theta_{dir}).$$

Therefore, in steps 346 and 348, the Y translation distance $Y_{pd}$ traveled by the mouse 12 is broken down into X and Y components along the $X_{user}$ and $Y_{user}$ axis. Upon completion of step 348, the computer system 10 advances to step 352 (FIG. 7b). If there is determined to be no $Y_{pd}$ motion in step 322, the computer system 10 proceeds directly to step 352.

In step 352, the computer system 10 determines if there was any X translational motion by the mouse 12, i.e., if $X_{pd}$ is non-zero. If so, then in step 354 the computer system 10 determines if the movement of the PDA 12 was in the positive X direction. If the movement is determined to be in the negative X direction in step 354, then in step 356 the computer system 10 adds 180° to the current value of $\theta_{user}$, i.e. the computer system 10 computes the value:

$$\theta_{dir}=\theta_{user}+180°.$$

If the motion was determined to be in the positive X direction in step 354, then the computer system 10 computes the value: $\theta_{dir}=\theta_{user}$ in step 358. Since the variables $\theta_{dir}$ and $\theta_{user}$ are defined in terms of the positive X axis, movement in the positive X direction along the positive X axis does not necessitate any change in the value of $\theta_{user}$. Therefore, $\theta_{dir}$ is set equal to $\theta_{user}$. However, if movement or translation has occurred in the negative X direction, then 180° is added to $\theta_{user}$ to account for this negative movement. Upon completion of either steps 356 or 358, the computer system 10 advances to step 362.

In step 362, the computer system 10 computes the absolute value of $X_{pd}$. In step 364 and 366, computer system 10 computes temporary values for the components of this $X_{pd}$ translational motion along the $X_{user}$ and $Y_{user}$ coordinate axes. In step 364, the computer system 10 computes:

$$X_{temp2}=|X_{pd}| \cos (\theta_{dir}).$$

In step 366, the computer system 10 computes:

$$Y_{temp2}=|X_{pd}| \sin (\theta_{dir}).$$

Therefore, in steps 346, 348, 364 and 366, the computer system 10 has computed the X and Y translational motion of the mouse 12, $X_{pd}$ and $Y_{pd}$, along the respective coordinate axes $X_{user}$ and $Y_{user}$. In step 372, the computer system 10 computes the new X and Y coordinates along the $X_{user}$ and $Y_{user}$ axes:

$$X_{user} = X_{user} + X_{temp1} + X_{temp2}$$

$$Y_{user} = Y_{user} + Y_{temp1} + Y_{temp2}$$

The computer system 10 then advances to step 374. If there was determined to be no $X_{pd}$ translation in step 352, then the computer system 10 proceeds directly to step 374. In step 374, the computer system 10 resets all temporary variables, including $\theta_{dir}$, $X_{temp1}$, $X_{temp2}$, $Y_{temp1}$ and $Y_{temp2}$. Upon completion of step 374, the computer system 10 returns to step 302 to receive a new set of $X_{pd}$, $Y_{pd}$ and $\theta_{pd}$ values from the mouse 12.

Therefore, position and orientation tracking software in the computer system 10 receives the translation and rotation information from the mouse 20, $X_{pd}$, $Y_{pd}$ and $\theta_{pd}$, and computes X and Y coordinates of movement along a set of coordinate axis $X_{user}$ and $Y_{user}$ that are fixed relative to the user's frame of reference. Thus, the computer system 10 can maintain exact information on the location and orientation of the mouse 12. In addition, in an alternate embodiment the mouse 12 is incorporated into a PDA and allows the PDA to keep track of its position and orientation on a document being scanned with respect to prior scanned lines. This allows memory in the PDA to concatenate scanned lines of the image or document and thus create an exact duplication of the document in memory.

Therefore, a pointing device 12 is disclosed which provides information on motion in both the X, Y, and yaw directions. Thus the pointing device provides greater accuracy with regard to motion than currently available mouse technology. The ability to monitor movement in the yaw direction enables the pointing device 12 to monitor movement with respect to the user's frame of reference not merely the mouse's frame of reference. Thus, the pointing device 12 of the present invention can provide exact location and orientation information of a scanning device with respect to prior positions of the device. This, for example, allows the intelligent scanning and recording of a two-dimensional document by a one-dimensional scanner.

Although the method and apparatus of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A pointing device, comprising:

a first motion indicator which detects changes in motion of said pointing device in a first Y direction and generates a first Y signal indicative thereof, a second motion indicator which detects changes in motion of said pointing device in a second Y direction and a first X direction perpendicular to said second Y direction and generates a second Y signal and an X signal indicative thereof; and a controller coupled to said first and second motion indicators which receives said signals from said first and second motion indicators and determines whether at least one of said first and second Y signals has been received, wherein said controller includes:

a timer comprised in said controller which begins counting a predetermined time when said controller determines that at least one of said first and second Y signals has been received;

wherein said controller uses said timer to determine if the other of said first and second Y signals has been received within said predetermined time after said at least one of said first and second Y signals was received, and uses one or more of said first and second Y signals to generate yaw information depending on whether said first and second Y signals were generated within said predetermined time of each other.

2. The pointing device of claim 1, wherein said pointing device is moved on a surface; and wherein said controller generates information regarding change of orientation of said pointing device relative to said surface.

3. The pointing device of claim 1, wherein said controller generates information regarding change of position of said pointing device in X, Y, and yaw directions.

4. The pointing device of claim 1, wherein said controller generates information regarding change of position of a point centered between said first and second motion indicators comprised in said pointing device.

5. The pointing device of claim 1, wherein said controller uses differences between said first Y signal and said second Y signal to generate said information on change of position in said yaw direction.

6. The pointing device of claim 1, wherein said controller receives said first and second Y signals from said first and second motion indicators and uses a look-up table to compute said information regarding change of position of said pointing device in said Y and yaw directions.

7. The pointing device of claim 1, wherein said information regarding change of position of said pointing device comprises $X_{pd}$ and $Y_{pd}$ values representing change of position of said pointing device along a set of coordinate axes whose frame of reference is said pointing device, and a $\theta_{pd}$ value representing change in rotation of said pointing device relative to a prior orientation of said pointing device.

8. The pointing device of claim 1, wherein said first and second Y directions are parallel to each other.

9. The pointing device of claim 1, wherein said first and second motion indicators comprise mouse balls.

10. The pointing device of claim 1, wherein said first and second motion indicators each comprise a light detector and receiver.

11. The pointing device of claim 1 wherein said controller uses both said first and second Y signals to generate yaw information if said first and second Y signals were generated within said predetermined time of each other.

12. The pointing device of claim 11, wherein said controller generates nonzero yaw information using both said first and second Y signals if said first and second Y signals were generated within said predetermined time of each other and said first and second Y signals indicate differing amounts of Y motion of said first and second motion indicators.

13. The pointing device of claim 1, wherein said controller generates yaw information using only one Y signal if one of either said first or second Y signals was generated and the other Y signal was not generated within said predetermined time of the one Y signal that was generated.

14. The pointing device of claim 1, wherein said controller includes:

means for determining if at least one of said first and second Y signals has been received;

means for initiating said timer if said at least one of said first and second Y signals has been received, wherein said timer counts said predetermined period of time;

means, coupled to said timer, for determining if the other of said first and second Y signals has been received within said predetermined time after said at least one of said first and second Y signals was received; and means for generating said yaw information using one or more of said first and second Y signals depending on whether said first and second Y signals were generated within said predetermined time of each other.

15. The pointing device of claim 1:

wherein said means for generating said yaw information uses a look-up table to generate said yaw information.

16. The pointing device of claim 1, wherein said timer only begins counting a predetermined time if only one of said first and second Y signals was received;

wherein said controller only determines if the other of said first and second Y signals has been received within said predetermined time after said at least one of said first and second Y signals was received if only one of said first and second Y signals was received.

17. A computer system comprising:

a video monitor including a video screen;

a system unit coupled to said video monitor including logic which manipulates a cursor on said video screen; and a pointing device coupled to said system unit which generates information regarding change of position of said pointing device in X, Y, and yaw directions, wherein said pointing device comprises:

a first motion indicator which detects changes in motion of said pointing device in a first Y direction and generates a first Y signal indicative thereof, a second motion indicator which detects changes in motion of said pointing device in a second Y direction and a first X direction perpendicular to said second Y direction and generates a second Y signal and an X signal indicative thereof, and a controller coupled to said first and second motion indicators which receives said signals from said first and second motion indicators and generates information regarding change of position of said pointing device in X, Y, and yaw directions, wherein said controller comprises:

means for determining whether at least one of said first and second Y signals has been received;

a timer coupled to said means for determining whether at least one of said first and second Y signals has been received, wherein said timer begins counting a predetermined time when said means for determining whether at least one of said first and second Y signals has been received determines that at least one of said first and second Y signals has been received;

second Y signal determining means coupled to said timer for determining if the other of said first and second Y signals has been received within said predetermined time after said at least one of said first and second Y signals was received; and means for generating yaw information using one or more of said first and second Y signals depending on whether said first and second Y signals were generated within said predetermined time of each other;

wherein said system unit receives said change of position information from said pointing device and uses said information to change the position of the cursor on said video screen.

18. The computer system of claim 17, wherein said information regarding change of position of said pointing device comprises $X_{pd}$ and $Y_{pd}$ values representing change of position of said pointing device along a set of coordinate axes whose frame of reference is said pointing device, and a $\theta_{pd}$ value representing change in rotation of said pointing device relative to a prior orientation of said pointing device.

19. The computer system of claim 18, wherein said system unit receives said $X_{pd}$, $Y_{pd}$, and $\theta_{pd}$ values from said pointing device, and uses said $X_{pd}$, $Y_{pd}$, and $\theta_{pd}$ values from said pointing device to change the position of said cursor on said video screen.

20. The computer system of claim 19, wherein said pointing device is moved along a surface; and wherein said system unit transforms said $X_{pd}$, $Y_{pd}$, and $\theta_{pd}$ values into $X_{user}$ and $Y_{user}$ coordinates which are based on a set of coordinate axes whose frame of reference is said surface.

21. The computer system of claim 17, wherein said controller uses both said first and second Y signals to generate yaw information if said first and second Y signals were generated within said predetermined time of each other.

22. The computer system of claim 21, wherein said controller generates nonzero yaw information using both said first and second Y signals if said first and second Y signals were generated within said predetermined tinge of each other and said first and second Y signals indicate differing amounts of Y motion of said first and second motion indicators.

23. The computer system of claim 17, wherein said controller generates yaw information using only one Y signal if one of either said first or second Y signals was generated and the other Y signal was not generated within said predetermined time of the one Y signal that was generated.

24. A pointing device, comprising:

a first mouse ball;

a first odometer wheel contacting said first mouse ball capable of detecting changes in motion of said mouse ball in a first Y direction and generating a first Y signal indicative thereof, a second mouse ball;

a second odometer wheel contacting said second mouse ball capable of detecting change in motion of said second mouse ball in a second Y direction and generating a second Y signal indicative thereof, a third odometer wheel contacting said second mouse ball capable of detecting change in motion of said second mouse ball in an X direction perpendicular to said second Y direction and generating an X signal indicative thereof, and a controller coupled to said first and second motion indicators which receives said signals from said first and second motion indicators and generates information regarding change of position of said pointing device in X, Y, and yaw directions, wherein said controller comprises:

means for determining whether at least one of said first and second Y signals has been received;

a timer coupled to said means for determining whether at least one of said first and second Y signals has been received, wherein said timer begins counting a predetermined time when said means for determining whether at least one of said first and second Y signals has been received determines that at least one of said first and second Y signals has been received;

second Y signal determining means coupled to said timer for determining if the other of said first and second Y signals has been received within said predetermined time after said at least one of said first and second Y signals was received; and means for generating yaw information using one or more of said first and second Y signals depending on whether said first and second Y signals were generated within said predetermined time of each other:

wherein said system unit receives said change of position information from said pointing device and uses said information to change the position of the cursor on said video screen.

25. A method of determining changes in yaw direction in a pointing device comprising a first motion indicator which detects changes in motion of said pointing device in a first Y direction and generates a signal indicative thereof and a second motion indicator which detects changes in motion of said pointing device in a second Y direction and a first X direction perpendicular to said second Y direction and generates signals indicative thereof, the method comprising the steps of:

receiving one or more of the first and second Y signals;

determining if a Y signal has been received;

initiating a timer if said Y signal has been received, wherein said timer counts a predetermined time;

determining if the other Y signal has been received within said predetermined time after said Y signal was received; and generating yaw information using one or more of the first and second Y signals depending on whether the first and second Y signals were generated within said predetermined time of each other.

26. The method of claim 25, wherein said step of generating includes generating yaw information using both said first and second Y signals if said first and second Y signals were generated within said predetermined time of each other.

27. The method of claim 25, wherein said step of generating includes generating nonzero yaw information using both said first and second Y signals if said first and second Y signals were generated within said predetermined time of each other and said first and second Y signals indicate motion of said first and second motion indicators in opposite Y directions.

28. The method of claim 25, wherein said step of generating comprises generating yaw information using only one Y signal if one of either said first or second Y signals was generated and the other Y signal was not generated within said predetermined time of the one Y signal that was generated.

\* \* \* \* \*